US012584266B2

(12) United States Patent
Noh et al.

(10) Patent No.: US 12,584,266 B2
(45) Date of Patent: Mar. 24, 2026

(54) CLOTHES TREATING APPARATUS AND CONTROL METHOD THEREOF

(71) Applicant: SAMSUNG ELECTRONICS CO., LTD., Suwon-si (KR)

(72) Inventors: Kyoungwoong Noh, Suwon-si (KR); Hyeongmo Gu, Suwon-si (KR); Kyusik Kim, Suwon-si (KR); Pyeongki Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 942 days.

(21) Appl. No.: 17/832,195

(22) Filed: Jun. 3, 2022

(65) Prior Publication Data

US 2022/0356637 A1 Nov. 10, 2022

Related U.S. Application Data

(63) Continuation of application No. PCT/KR2020/013773, filed on Oct. 8, 2020.

(30) Foreign Application Priority Data

Dec. 5, 2019 (KR) ........................ 10-2019-0160434

(51) Int. Cl.
*D06F 58/50* (2020.01)
*D06F 34/10* (2020.01)
(Continued)

(52) U.S. Cl.
CPC .............. *D06F 58/50* (2020.02); *D06F 34/10* (2020.02); *D06F 34/20* (2020.02); *D06F 58/08* (2013.01);
(Continued)

(58) Field of Classification Search
CPC .......... D06F 58/50; D06F 34/10; D06F 34/20; D06F 58/08; D06F 58/206; D06F 2105/46; D06F 2103/44; H02K 7/14; H02P 27/06
See application file for complete search history.

(56) References Cited

U.S. PATENT DOCUMENTS

| | | | | |
|---|---|---|---|---|
| 6,539,753 B1 * | 4/2003 | Ito | ........................... | D06F 37/42 68/24 |
| 2010/0251776 A1 * | 10/2010 | Bischoff | ................. | D06F 34/10 333/167 |
| 2016/0115632 A1 * | 4/2016 | Jung | ....................... | D06F 33/38 68/12.05 |

FOREIGN PATENT DOCUMENTS

| | | |
|---|---|---|
| EP | 1 116 812 A1 | 7/2001 |
| EP | 2 843 118 A1 | 3/2015 |

(Continued)

OTHER PUBLICATIONS

Office Action dated Nov. 19, 2024 issued in European Application No. 20 895 765.4.

(Continued)

*Primary Examiner* — Connor J Tremarche
(74) *Attorney, Agent, or Firm* — STAAS & HALSEY LLP

(57) ABSTRACT

The present disclosure relates to a clothes treating apparatus including a drum, a door to open and close the drum, an opening/closing switch to output a signal in response to opening or closing of the drum by the door, a motor to rotate the drum, a controller to generate a control command for controlling a rotational speed of the motor, a driving device including an inverter to convert power applied to the motor and an inverter driver to output a control signal of the inverter in response to the generated control command, and a protection switch connected between the opening/closing (Continued)

switch and the inverter driver to be turned on or off by the signal output by the opening/closing switch, wherein the inverter driver turns off the inverter when a voltage applied by the protection switch is less than or equal to a reference voltage.

14 Claims, 9 Drawing Sheets

(51) Int. Cl.
| | |
|---|---|
| *D06F 34/20* | (2020.01) |
| *D06F 58/08* | (2006.01) |
| *D06F 58/20* | (2006.01) |
| *H02K 7/14* | (2006.01) |
| *H02P 27/06* | (2006.01) |
| *D06F 103/40* | (2020.01) |
| *D06F 103/44* | (2020.01) |
| *D06F 105/26* | (2020.01) |
| *D06F 105/46* | (2020.01) |

(52) U.S. Cl.
CPC ............. *D06F 58/206* (2013.01); *H02K 7/14* (2013.01); *H02P 27/06* (2013.01); *D06F 2103/40* (2020.02); *D06F 2103/44* (2020.02); *D06F 2105/26* (2020.02); *D06F 2105/46* (2020.02)

(56) References Cited

FOREIGN PATENT DOCUMENTS

| | | | | | |
|---|---|---|---|---|---|
| EP | 2 836 635 | B1 | | 6/2016 | |
| EP | 2843118 | B1 * | 7/2021 | ............ | D06F 58/38 |
| JP | 8-229299 | A | | 9/1996 | |
| KR | 91-2190 | B1 | | 4/1991 | |
| KR | 20-1993-0014406 | U | | 7/1993 | |
| KR | 10-2001-0052443 | | | 6/2001 | |
| KR | 10-0352070 | B1 | | 9/2002 | |
| KR | 10-0421377 | B1 | | 3/2004 | |
| KR | 10-2011-0040081 | A | | 4/2011 | |
| KR | 10-1495182 | B1 | | 2/2015 | |
| KR | 10-2019-0101737 | A | | 9/2019 | |
| KR | 10-2025181 | B1 | | 9/2019 | |

OTHER PUBLICATIONS

Office Action dated Nov. 30, 2024 issued in Korean Application No. 10-2019-0160434.
International Search Report dated Feb. 2, 2021, in Application No. PCT/KR2020/013773.
European Search Report dated Dec. 2, 2022, in European Application No. 20 89 5765.

* cited by examiner

CLOTHES TREATING APPARATUS AND CONTROL METHOD THEREOF

CROSS-REFERENCE TO RELATED APPLICATIONS

This application is a continuation application filed under 35 U.S.C. § 111(a) of International Application PCT/KR2020/013773 filed Oct. 8, 2020, it being further noted that foreign priority benefit is based upon Korean patent application 10-2019-0160434 filed Dec. 5, 2019, in the Korean Intellectual Property Office, the disclosures of which are incorporated by reference herein in their entireties.

BACKGROUND

1. Field

The present disclosure relates to a clothes treating apparatus to perform an operation for preventing a failure in response to an abnormal situation during driving, and a control method thereof.

2. Description of Related Art

In general, a clothes treating apparatus is an apparatus for washing or drying laundry by rotating a cylindrical rotating tub accommodating the laundry.

The clothes treating apparatus may be classified into a clothes treating apparatus of a front loading method in which a drum is horizontally disposed and a laundry inlet is formed in the front thereof, and a clothes treating apparatus of a top loading method in which a drum is vertically disposed and a laundry inlet is formed thereon.

Such a clothes treating apparatus may include a motor for rotating the drum. In addition, in the case of a clothes treating apparatus that performs a drying function using a heat pump, the clothes treating apparatus may further include a motor for operating a compressor in the heat pump.

In such a conventional clothes treating apparatus, because the motor does not stop when a door is opened during operation, a safety accident in which a user is injured may occur.

In particular, in the case of a clothes treating apparatus that performs the drying function, as an object to be dried is dried, a volume of the object to be dried increases so that the door shakes, and in this case, the clothes treating apparatus determines that it is an abnormal situation and stops a drying process. This causes the drying of the object to be dried to be stopped. In the case of re-drying the object to be dried, the user needs to re-operate the clothes treating apparatus, or the drying process may be delayed due to the re-operation.

SUMMARY

Aspects of various embodiments of the present disclosure will be set forth in part in the description which follows and, in part, will be apparent from the description, or may be learned by practice of the presented embodiments.

An aspect of various embodiments of the present disclosure provides a clothes treating apparatus including a drum, a door provided to open and close the drum, an opening/closing switch provided to output a signal in response to opening or closing of the drum by the door, a motor provided to rotate the drum, a controller configured to generate a control command for controlling a rotational speed of the motor, a driving device including an inverter provided to convert power applied to the motor and an inverter driver provided to output a control signal of the inverter in response to the generated control command, and a protection switch connected between the opening/closing switch and the inverter driver to be turned on or off by the signal output by the opening/closing switch, wherein the inverter driver turns off the inverter when a voltage applied by the protection switch is less than or equal to a reference voltage.

The clothes treating apparatus may further include a rectifier provided to rectify AC power, and a smoothing part provided to smooth the rectified power and apply the smoothed power to the inverter.

The protection switch may be connected to a terminal provided to output a failure signal among terminals provided in the inverter driver.

The inverter may include a plurality of power conversion switches, and the inverter driver may transmit signals for turning off lower switches among the plurality of power conversion switches.

The protection switch may include a bipolar junction transistor (BJT).

The clothes treating apparatus may further include a first resistor connected between a base of the bipolar junction transistor and the opening/closing switch, a second resistor connected between the base and an emitter of the bipolar junction transistor, a third resistor connected between a collector of the bipolar junction transistor and a first power terminal, a photo coupler connected between the third resistor and the inverter driver, and a fourth resistor connected between the photo coupler and a second power terminal and connected to the inverter driver.

The bipolar junction transistor may be turned off when a turn-off signal is output by the opening/closing switch and turned on when a turn-on signal is output by the opening/closing switch. The photo coupler may be turned off when the bipolar junction transistor is turned on and turned on when the bipolar junction transistor is turned off.

The inverter driver may further include a voltage detector provided to detect a voltage in response to turning on or off of a metal oxide semiconductor field effect transistor.

The clothes treating apparatus may further include a fan provided to be rotated by the motor.

The clothes treating apparatus may further include a heat pump including a compressor, a condenser connected to the compressor, an expansion valve connected to the condenser, and an evaporator connected to the expansion valve, and provided to circulate a refrigerant in the order of the compressor, the condenser, the expansion valve, and the evaporator, and a driving device for the heat pump provided to operate the heat pump in response to a control command of the controller.

The controller may be configured to determine an abnormal state of the door based on a signal of the opening/closing switch, and maintain an operation of the heat pump for a predetermined time when it is determined that the door is in the abnormal state.

The controller may be configured to stop an operation of the compressor when it is determined that the abnormal state of the door is maintained even after a predetermined time elapses from a time point at which the abnormal state of the door is determined.

The controller may be configured to, when a turn-on signal and a turn-off signal are alternately output by the opening/closing switch, maintain an operation of the compressor for a predetermined time from a time point at which the turn-off signal is first received.

The clothes treating apparatus may further include a display device provided to output a notification in response to the abnormal state of the door.

The clothes treating apparatus may further include a fan provided to circulate air through the inside and outside of the drum, and a motor for the fan provided to rotate the fan, wherein the controller may be configured to determine an abnormal state of the door based on the signal output by the opening/closing switch, and when it is determined that the door is in an abnormal state, maintain an operation of the motor for the fan for a predetermined time.

The clothes treating apparatus may further include an opening/closing detector provided to detect the opening and closing of the door, wherein the controller may be configured to determine an opened state or a closed state of the door based on detection information of the opening/closing detector, and turn off the opening/closing switch when it is determined that the door is in the closed state.

The inverter driver may further include a current sensor provided to detect a current flowing in the motor, a failure output switch provided to determine that an overcurrent occurs when a current output through the current sensor is equal to or greater than a reference current and to be turned on in response to the overcurrent occurrence, and a terminal provided to connect the failure output switch and the controller.

Another aspect of various embodiments of the present disclosure provides a control method of a clothes treating apparatus which includes a heat pump, the control method including operating a motor and the heat pump connected to a drum when a drying operation is performed, determining an abnormal state of a door based on a signal received from an opening/closing switch during the drying operation, stopping the operation of the motor when it is determined that the door is in the abnormal state and maintaining an operation of a compressor provided in the heat pump for a predetermined time, and stopping the operation of the compressor when the predetermined time elapses, wherein the maintaining of the operation of the compressor for the predetermined time includes re-driving the motor connected to the drum when a preset time elapses from a time point of determining the abnormal state of the door, and stopping the operation of the compressor when it is determined that the abnormal state of the door is maintained upon the re-driving of the motor.

The control method may further include turning off a protection switch in response to a turn-off signal of the opening/closing switch, and automatically stopping the operation of the motor in response to a voltage corresponding to the turn-off state of the protection switch.

The determining of the abnormal state of the door may include determining whether the turn-off signal is received from the opening/closing switch.

BRIEF DESCRIPTION OF THE DRAWINGS

The above and other aspects, features, and advantages of various embodiments of the present disclosure will be more apparent from the following description taken in conjunction with the accompanying drawings, in which.

DETAILED DESCRIPTION

Figure 1:
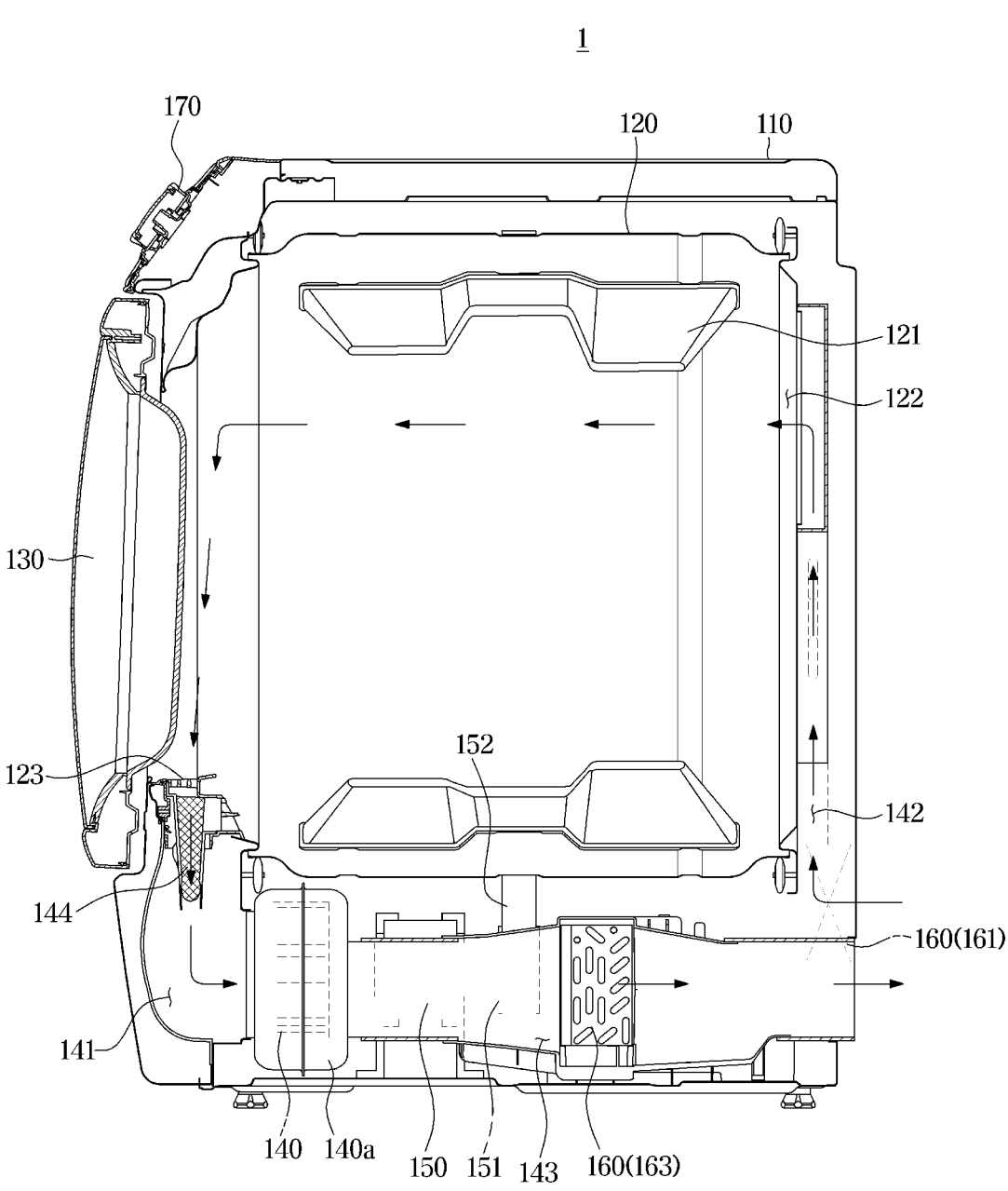
FIG. 1 is a cross-sectional view of a dryer which is a clothes treating apparatus according to an embodiment.

Throughout the specification, like reference numerals refer to like elements. This specification does not describe all the elements of the embodiments, and duplicative contents between general contents or embodiments in the technical field of the present disclosure will be omitted.

The term 'device' used in this specification may be embodied as software or hardware, and it is also possible for a plurality of 'devices' to be embodied as one component, or one 'device' to include a plurality of components according to embodiments.

Throughout the specification, when a part is referred to as being "connected" to another part, it includes not only a direct connection but also an indirect connection, and the indirect connection includes connecting through a wireless network.

Also, when it is described that a part "includes" an element, it means that the element may further include other elements, not excluding the other elements unless specifically stated otherwise.

The terms 'first,' 'second,' etc. are used to distinguish one element from another element, and the elements are not limited by the above-mentioned terms.

The singular forms "a," "an," and "the" include plural referents unless the context clearly dictates otherwise.

In each process, an identification numeral is used for convenience of explanation, the identification numeral does not describe the order of the processes, and each process may be performed differently from the order specified unless the context clearly states a particular order.

Various embodiments of the present disclosure are directed to providing a clothes treating apparatus capable of stopping an operation of a motor rotating a drum, and maintaining an operation of a motor of a compressor of a heat pump, when an abnormal signal of a door is generated, and a control method thereof.

Moreover, various embodiments of the present disclosure are directed to providing a clothes treating apparatus capable of outputting a turn-off signal of an inverter based on a voltage signal applied to a terminal outputting a failure signal of a motor, and a control method thereof.

According to various embodiments of the present disclosure, a clothes treating apparatus may prevent a failure of a motor and a safety accident of a user by stopping the rotation of a drum when an abnormal state of a door occurs.

Even when a volume of an object to be dried increases while moisture is removed from the object to be dried upon a drying operation so that the door shakes, or even when the abnormal state of the door occurs due to forcibly opening the door, the clothes treating apparatus according to various embodiments of the present disclosure may prevent drying from being stopped by performing the drying through a heater pump.

Because the clothes treating apparatus according to various embodiments of the present disclosure stops the rotation of the drum when the abnormal state of the door occurs by connecting an opening/closing switch only to a driving device for controlling the rotation of the drum, there is no need to separately configure a power supply for controlling the power applied to the drum. Due to this, a clothes treating apparatus according to various embodiments of the present disclosure can reduce a circuit configuration for rotating a compressor and the drum by 50% and simplify a circuit structure.

Furthermore, according to various embodiments of the present disclosure, the quality and merchantability of the clothes treating apparatus may be improved, the satisfaction of the user may be increased, the stability of the clothes treating apparatus may be improved, and the competitiveness of the product may be secured.

Hereinafter, various embodiments of the present disclosure will be described in detail with reference to the accompanying drawings.

A clothes treating apparatus may include a washing machine that washes, rinses, and dewaters laundry by rotating a cylindrical rotating tub accommodating the laundry.

The clothes treating apparatus may be a dryer capable of washing, rinsing, dewatering, and drying laundry by rotating a cylindrical rotating tub accommodating the laundry.

The clothes treating apparatus may be a dryer that performs drying of an object to be dried by rotating a cylindrical rotating tub accommodating the object to be dried and supplying high-temperature dry hot air.

That is, the dryer is an apparatus that performs drying of an object to be dried by supplying high-temperature dry hot air to a drying space in which the object to be dried is accommodated, and the object to be dried includes all objects that may be dried through hot air. For example, the object to be dried includes those implemented with various types of fibers and fabrics such as cloth, clothes, towels, and blankets, and there is no limitation.

Dryers are classified into a heater type, a heat pump type, and a hybrid type using a heater and a heat pump at the same time depending on a heat source for heating air.

In the present embodiment, a heat pump type dryer among clothes treating apparatus will be described as an example.

Figure 2:
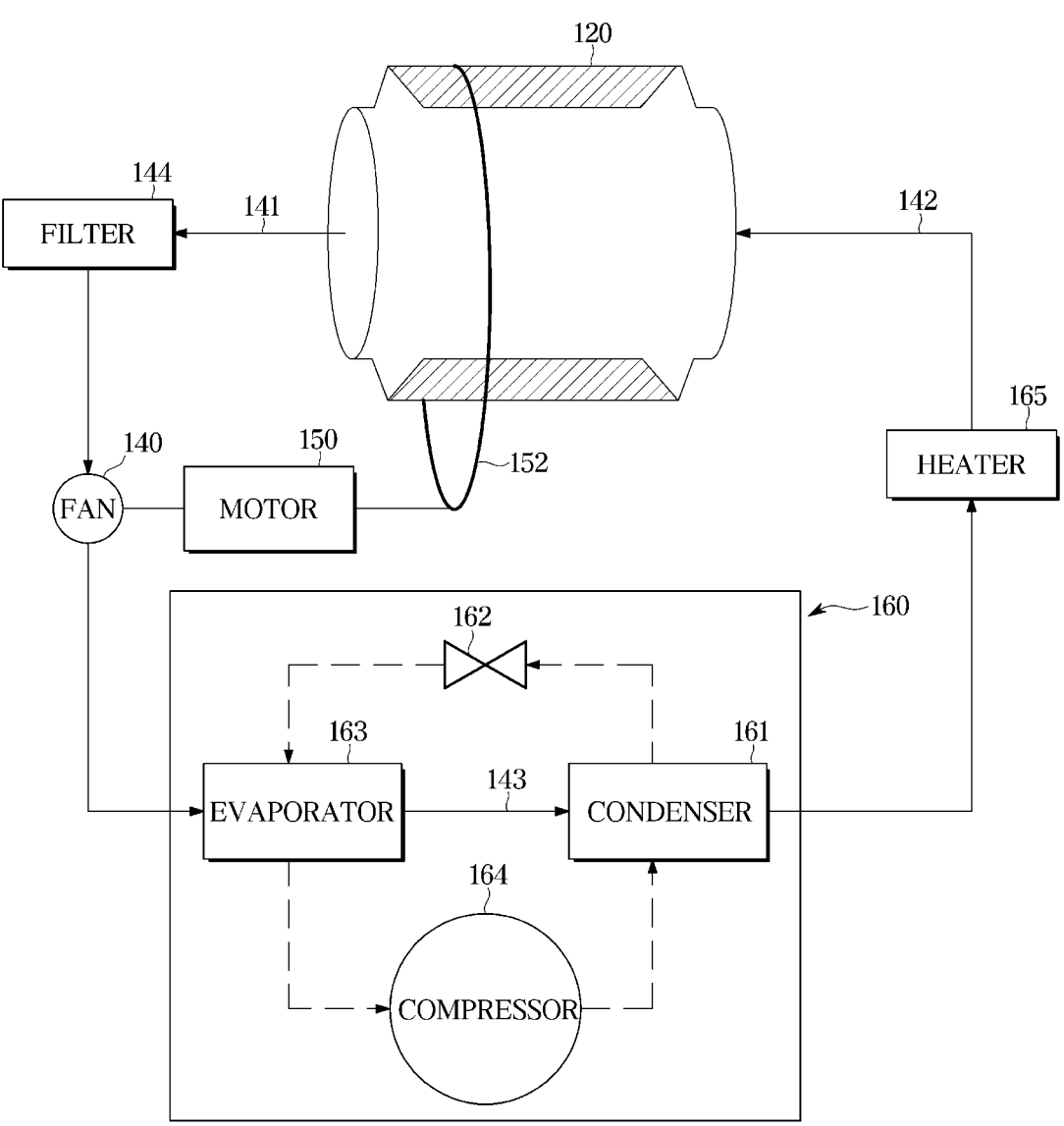
FIG. 2 is an exemplary view of a heat pump in the dryer which is a clothes treating apparatus according to an embodiment.

FIG. 1 is a cross-sectional view of a dryer which is a clothes treating apparatus according to an embodiment, and FIG. 2 is an exemplary view of a heat pump in the dryer which is a clothes treating apparatus according to an embodiment.

A dryer 1 includes a main body 110 forming an exterior, a drum 120 provided inside the main body 110, a door 130 provided on the outside of the main body, a fan 140 provided inside the main body 110 to circulate air between the inside and the outside of the drum 120, a motor 150 provided inside the main body 110 to transmit a rotational force for rotating the drum 120 and the fan 140, and a heat pump 160 provided inside the main body 110 to generate hot air.

The main body 110 may be formed in the shape of a rectangular parallelepiped long in a vertical direction. However, this is an example for convenience of description, and the main body 110 may be implemented in various shapes.

The main body 110 accommodates the drum 120, a drive assembly 140 and a drying assembly 150. An opening may be formed on a front surface of the main body 110. This opening may be provided at a position corresponding to an opening of the drum 120 and may be provided in a shape corresponding to the opening of the drum.

A user may put an object to be dried into the drum 120 through the opening of the main body and may take out the object to be dried in the drum 120.

The main body 110 may be provided with a user interface 170.

The user interface 170 may include an input device provided to input an operation command for an operation of the dryer 1, and a display device provided to display operation information of the clothes dryer 1.

The input device may receive various user inputs for operating the dryer 1. The input device may be implemented in various forms, such as a press-type button, a switch, and a key-turning-type dial. The input device may select an operation process (or operation course) of the dryer 1. The operation process may include a drying process.

The display device may display the operation information of the dryer 1 as a visual image. In this case, the display device may be provided as a touch screen capable of receiving a manipulation command of the user. The drum 120 may rotate clockwise or counterclockwise in the main body 110 by a driving force of the motor 150.

The drum 120 may be rotatably provided in the main body 110. The drum 120 may rotate clockwise or counterclockwise in the main body 110 by a rotational force of the motor 150.

The drum 120 includes a drying space connected to the opening of the main body and may accommodate an object to be dried. The drum 120 may allow the object to be dried to move within the drum through rotation. In this case, the object to be dried putted into the drying space (not shown) of the drum 120 through the opening of the main body 110 may be dried by hot air introduced into the drying space (not shown).

A plurality of lifters 121 may be provided on an inner circumferential surface of the drum 120 to lift an object to be dried. The plurality of lifters 121 may be formed to protrude from the inner circumferential surface of the drum 120.

The drum 120 includes a suction port 122 provided on a rear surface thereof to suck in hot air, and a discharge port 123 provided at a lower portion of a front surface thereof to discharge air containing moisture to the outside of the drum.

A detector (not shown) to detect at least one of a temperature and humidity of an object to be dried accommodated in the drum 120 is provided around at least one of the suction port 122 and the discharge port 123 of the drum 120. A detector (not shown) to detect a dryness degree of the object to be dried accommodated in the drum 120 may be provided in the drum 120.

The door 130 may be pivotally coupled to the front surface of the main body 110 to open and close the opening provided on the front surface of the main body 110. The door 130 may close or open the drying space inside the drum 120.

More specifically, a hinge may be disposed at a portion adjacent to the door 130 on the front surface of the main body 110, and in this case, the door 130 may be open and close the opening of the main body 110 by being connected to the hinge and rotating about the hinge.

The door 130 may be formed in a circular shape corresponding to the shape of the opening and may be provided to have a larger diameter than the opening. That is, the door 130 may open the opening by being in contact with the surface forming the opening of the main body 110, or may close the opening by being separated from the surface forming the opening of the main body 110.

The dryer 1 may further include an opening/closing switch 240 (refer to FIG. 3) provided on the main body 110 such that a terminal is contacted or separated in response to a coupled or separated state of the door 130 and the main body 110, and to output a turn-on or turn-off signal in response to contact or separation of the terminal.

Also, the dryer 1 may include an opening/closing detector 181 (refer to FIG. 3) provided to detect an opened state or a closed state of the door and output a signal corresponding to the detected opened or closed state, and an opening/closing switch 240 (refer to FIG. 3) provided to be turned on or off in response to a control command of the controller.

The fan 140 is provided to suck in high-temperature and humid air in the drum 120 and supply air heat-exchanged in the heat pump 170 to the inside of the drum 120. The fan 140 may be disposed in a fan housing 140*a*.

The dryer 1 may include a discharge flow path 141 to connect the drum 120 and the fan housing 140*a* and allow air in the drum 120 to move into the fan housing 140*a*, a supply flow path 142 to connect the heat pump 160 and the drum 120 and allow high-temperature air generated in the heat pump 160 to move into the drum, and a heat exchange flow path 143 disposed between the discharge flow path 141 and the supply flow path 142 such that heat exchange of air is performed and the heat-exchanged air is moved. In the supply flow path 142, a suction port through which air is supplied from the outside of the main body 1 and a discharge port through which a part of the heat-exchanged air is discharged to the outside of the main body may be provided.

The dryer 1 may further include a filter 144 provided to collect various foreign substances such as lint contained in the air to be discharged from the drum 120 to the discharge flow path 141. The filter 144 is provided at an inlet of the discharge flow path 141 and may be provided at a connection portion where the drum 120 and the inlet of the discharge flow path are connected. The dryer may purify air generated upon the drying process through the filter 144 and discharge the purified air to the discharge flow path 141.

The motor 150 performs rotation and transmits a rotational force generated by the rotation to the drum 120. A rotational speed of the drum 120 may be regulated by regulating a rotational speed of the motor 150.

In order to transmit the rotational force of the motor 150 to the drum 120, the dryer further includes a pulley 151 provided to rotate by receiving power from the motor 150, and a belt 152 provided to rotate the drum 120 while rotating by the rotation of the pulley 151. That is, the belt 152 is installed on an outer surface of the pulley 151 and an outer surface of the drum 120 so that the drum 120 is rotated as the pulley 151 is rotated by the driving of the motor 150.

The motor 150 may transmit the generated rotational force to the fan 140. In this case, a shaft of the motor 150 may extend to opposite sides. That is, the pulley 151 may be connected to one side of the shaft of the motor 150 and the fan 140 may be connected to the other side.

The motor 150 may rotate the fan 140 by transmitting the rotational force to the fan 140. Through this, hot air may be uniformly applied to an object to be dried through the fan 140 while the object to be dried putted into the drying space (not shown) in the drum 120 is tumbled.

The dryer 1 may further include a heat source to dry an object to be dried accommodated in the drum. The heat source may include a heat pump, may include a heater, or may include both the heat pump and the heater.

The heat pump 160 performs heat exchange with air circulating in the main body 110. The heat pump 160 may include a refrigeration system 160*a* configured to circulating a refrigerant to perform heat exchange of air discharged from the drum 120 and supply the heat-exchanged high-temperature air to the inside of the drum.

The refrigeration system 160*a* includes a condenser 161, an expansion valve 162, an evaporator 163 and a compressor 164. The refrigerant may circulate while undergoing a series of phase changes continuously repeating compression-condensation-expansion-evaporation. The condenser 161 and the evaporator 163 may be implemented in the form of a heat exchanger capable of exchanging heat with air.

The condenser 161 heats the surrounding air. At this time, the heated air may move into the drum 120 through the supply flow path 142. The surrounding air may be air existing in the main body, or may be air introduced from the outside of the main body 110.

The condenser 161 is connected to the compressor 164 so that when the refrigerant compressed from the compressor 164 is introduced, the refrigerant is condensed into a liquid phase. At this time, the condenser may release heat to the surroundings through a condensation process.

The expansion valve 162 may expand a liquid refrigerant in a high-temperature and high-pressure state condensed in the condenser 161 into the liquid refrigerant in a low-pressure state by adjusting a pressure difference in the refrigerant. The expansion valve 162 may include an electronic expansion valve (EEV) in which an opening degree thereof is variable through an electrical signal. The expansion valve may regulate a flow rate of the refrigerant by adjusting the opening degree.

The refrigeration system may also include a capillary provided to expand the refrigerant into the liquid refrigerant of the low-pressure state.

The expansion valve 162 may adjust a degree of superheat, which is a temperature difference between an inlet and an outlet of the evaporator, and may also adjust a temperature of the refrigerant discharged from the compressor 164, by regulating the flow rate of the refrigerant.

The evaporator 163 may evaporate the liquid refrigerant in a low-temperature and low-pressure state introduced through the expansion valve 162, and may supply a gas refrigerant in the low-temperature and low-pressure state changed through heat exchange to the compressor 164. At this time, the evaporator 163 may take heat from the surroundings through an evaporation process of changing the liquid refrigerant into a gas refrigerant. That is, the evaporator 163 may condense moisture contained in the surrounding air to remove moisture in the air.

In other words, the hot and humid air discharged from the drum 120 is cooled in the evaporator 163, and at this time condensed water is generated as moisture in the air is condensed. This condensed water falls below the evaporator 163 and may be collected by a drip tray (not shown) provided below the evaporator 163. The condensed water collected in the drip tray may be moved to a storage or drained to the outside of the main body 110.

The compressor 164 compresses and discharges the refrigerant into the high-temperature and high-pressure state. At this time, the refrigerant discharged from the compressor 164 may be introduced into the condenser 161. In this case, the compressor 164 may compress the refrigerant through a reciprocating motion of a piston or a rotational motion of a rotating body.

The dryer 1 may further include a heater 165 that is a heat source capable of heating air. The heater 165 may be implemented through a heating coil, but is not limited thereto.

The heater 165 further heats air transferred through heat exchange in the condenser to increase a temperature of the air, and then supplies the air with the increased temperature into the drum.

The heater 165 may be an electric heater. For example, the heater 165 may be a heater using a plurality of heating wires that generate heat while passing an electric current. Alternatively, the heater 165 may be a positive temperature coefficient heater (PTC).

The heater 165 may be a gas heater. For example, the heater 165 may include an igniter and a valve to provide gas to the igniter. The igniter is heated when power is applied, and when a temperature of the igniter reaches a preset temperature, the valve may be opened to provide gas to the igniter. When the gas comes into contact with the igniter having the preset temperature, the igniter may be ignited to heat the surrounding air.

The heater 165 may apply a current to the plurality of heating wires in response to the control command of a controller 190 or adjust an amount of gas to be supplied to adjust an amount of heat energy to be transmitted to the air.

Figure 3:
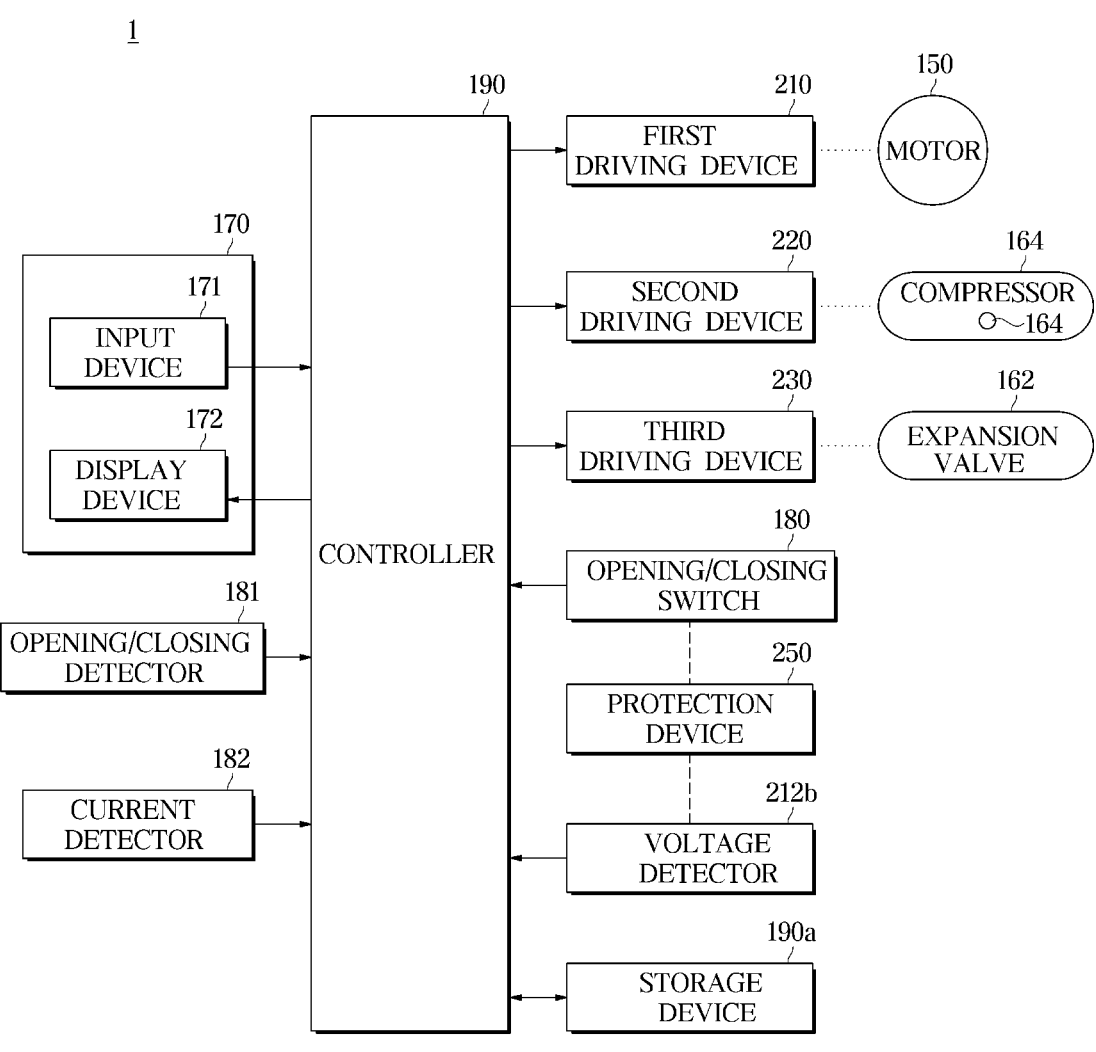
FIG. 3 is a control configuration diagram of the dryer according to an embodiment.

FIG. 3 is a control configuration diagram of the dryer according to an embodiment, which will be described with reference to FIGS. 4 to 7.

Figure 4:
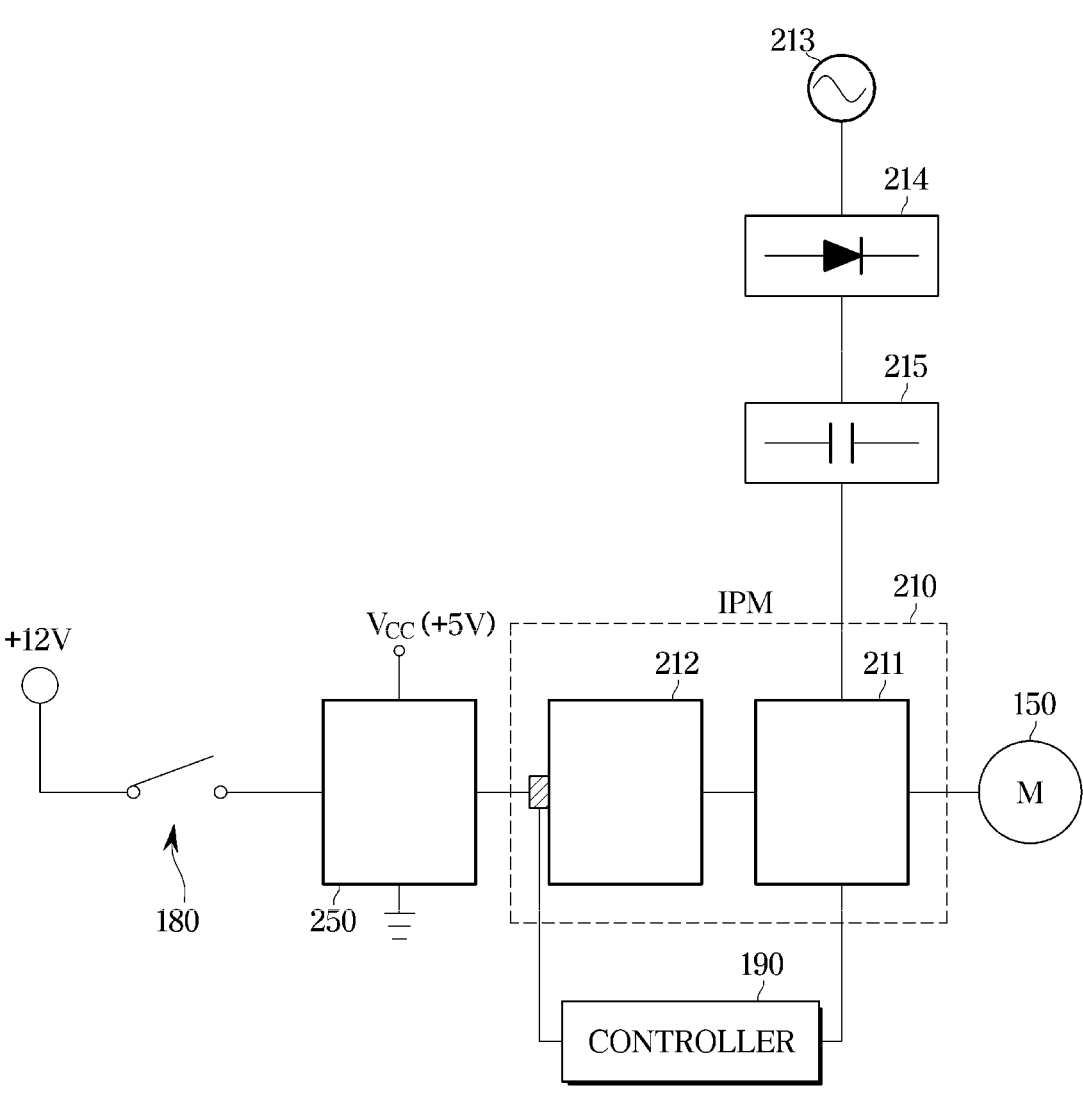
FIG. 4 is a diagram illustrating a connection between a first driving device and a protector provided in a dryer according to an embodiment.
Figure 5:
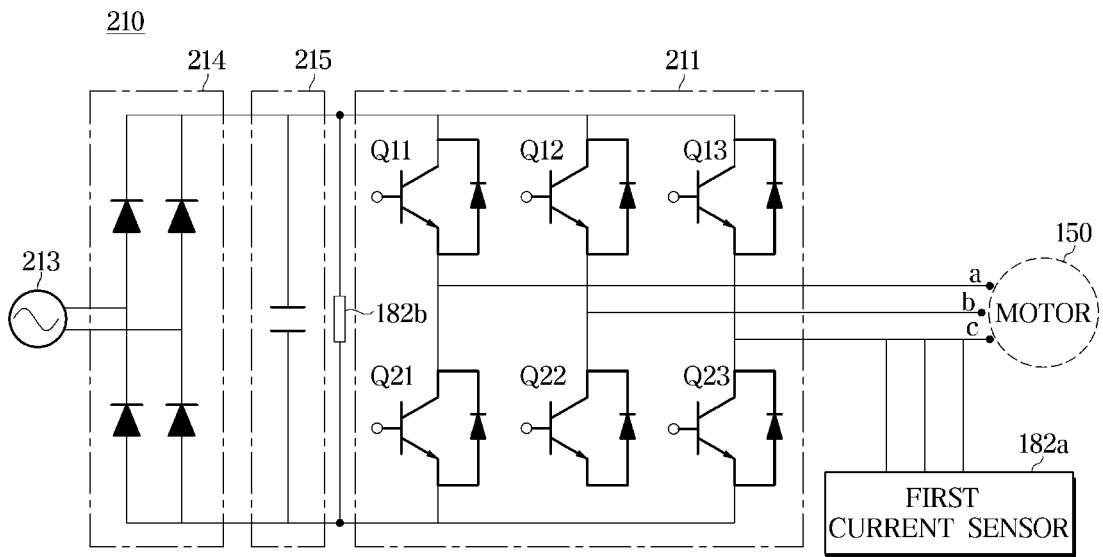
FIG. 5 is a circuit configuration diagram of a first inverter illustrated in FIG. 4.
Figure 6:
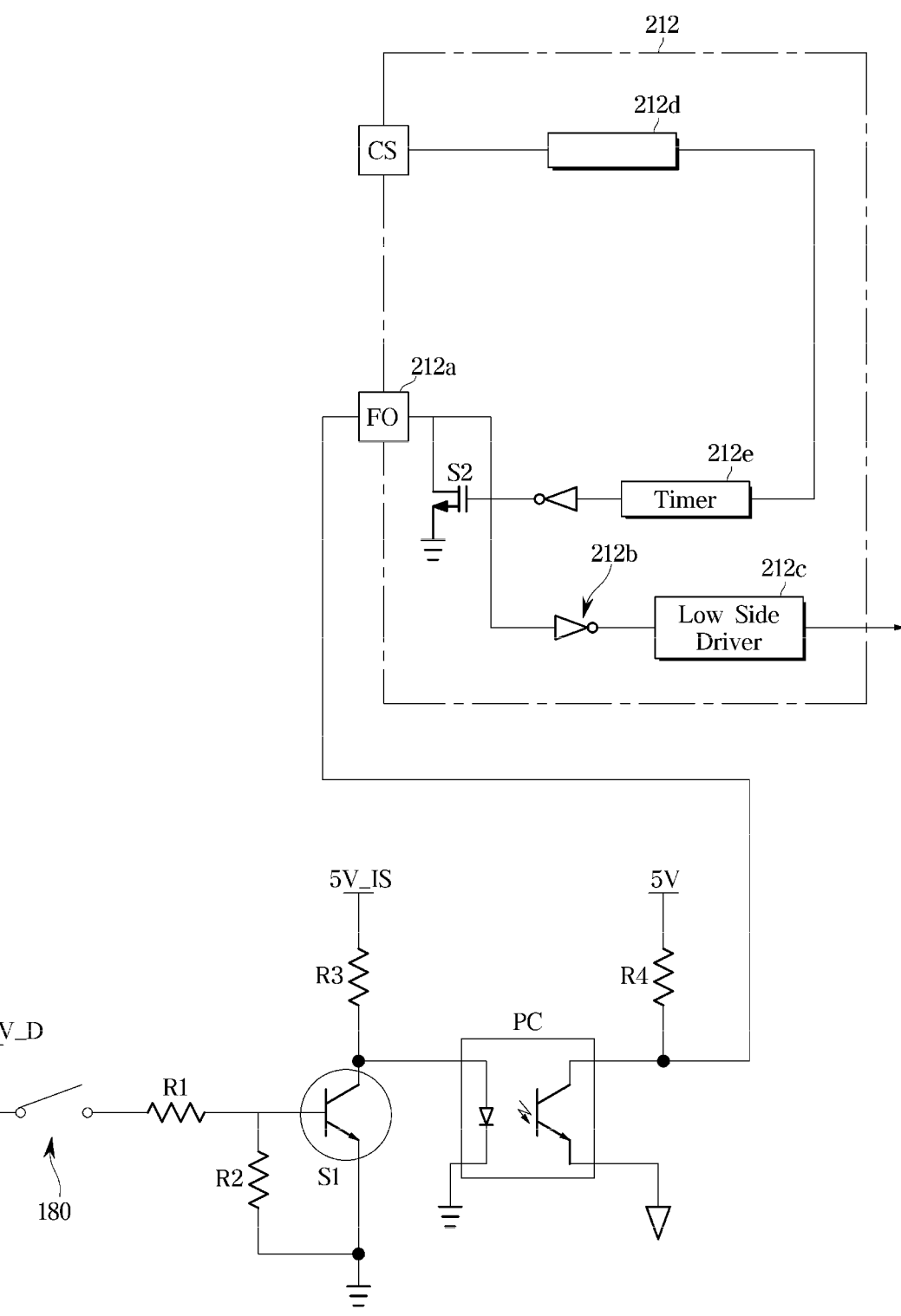
FIG. 6 is a circuit configuration diagram of a first inverter driver and the protector illustrated in FIG. 4.
Figure 7:
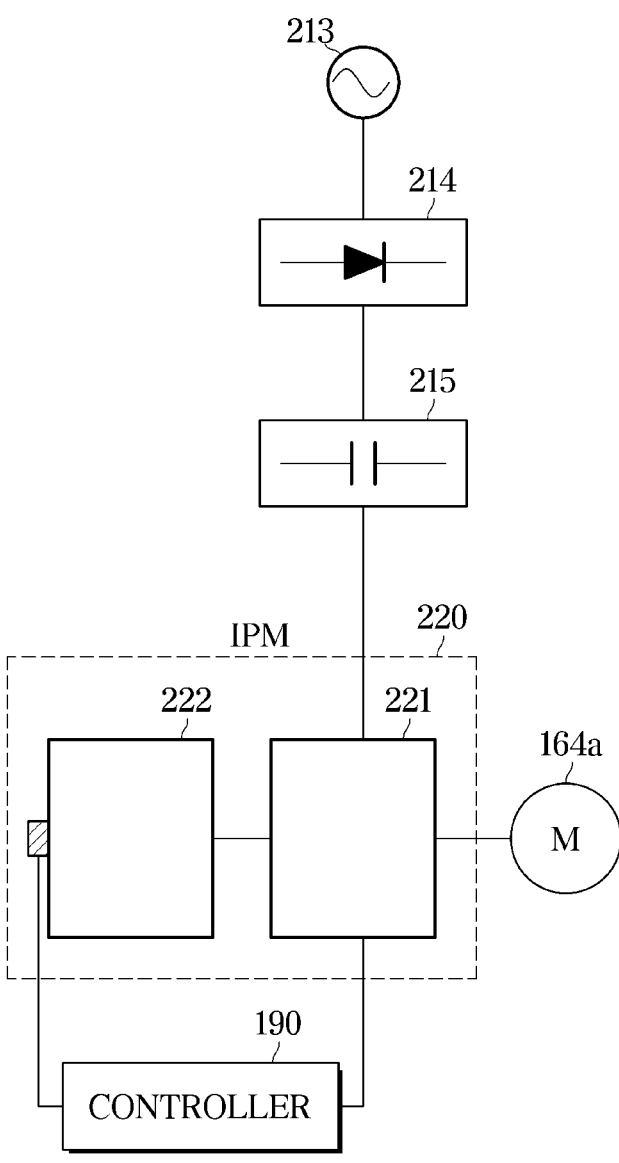
FIG. 7 is an exemplary view of a second driving device provided in the dryer according to an embodiment.

FIG. 4 is a diagram illustrating a connection between a first driving device and a protector provided in a dryer according to an embodiment, FIG. 5 is a circuit configuration diagram of a first inverter illustrated in FIG. 4, FIG. 6 is a circuit configuration diagram of a first inverter driver and the protector illustrated in FIG. 4, and FIG. 7 is an exemplary view of a second driving device provided in the dryer according to an embodiment.

As illustrated in FIG. 3, the dryer 1 includes the user interface 170, a plurality of detectors 181 and 182, the controller 190, a storage device 190a, and a plurality of driving devices 210, 220, and 230.

The user interface 170 may include an input device 171 provided to receive a user input, and a display device 172 provided to display the operation information of the dryer and input information corresponding to the user input.

The user input may include a target dryness degree. For example, the target dryness degree may include a preset dryness degree programmed in the dryer, and may include a first dryness degree, a second dryness degree, and a third dryness degree set by the user. The first dryness degree may be the lowest dryness degree, and the third dryness degree may be the highest dryness degree.

The user input may also be a drying start command, a temporary stop command, and a drying end command.

The display device 172 may display at least one of the dryness degrees selected by the user. The display device 172 may also display the preset dryness degree.

The display device 172 may display information on a drying load, a total drying time, and a remaining drying time. The display device 172 may also display an additional time of a secondary drying process.

The display device 172 may also display a temperature in the drum, that is, a drying temperature.

The display device 172 may also display abnormal state information corresponding to the opening of the door or the shaking of the door upon the drying process.

The display device 172 may also display operation information of the heat pump when the abnormal state of the door occurs.

The display device 172 may also display drying process stop information due to the abnormal state of the door.

The dryer 1 may include an opening/closing switch 180 provided to be in a state of being turned on by applying an external force when the door 130 comes into contact with the main body 110 and to be in a state of being turned off by removing the external force when the door 130 is separated from the main body 110. In this case, the opening/closing switch 180 may output a turn-on signal corresponding to the turn-on state to the controller 190 and a protector 250, and may output a turn-off signal corresponding to the turn-off state to the controller 190 and the protector 250.

Herein, the protector 250 may not be a component operating in response to the control command of the controller 190, but may be a component passively operating depending on power applied from the opening/closing switch. A description thereof will be given later.

The opening/closing switch 180 may receive a voltage of about 12V from a power supply (not shown). The power supply may be a smooth part of a first driving device.

The dryer may further include the opening/closing detector 181 provided to detect opening or closing of the door 130. In this case, the opening/closing switch 240 may be switched to a turn-on state or a turn-off state based on the control command of the controller 190.

The current detector 182 may also detect a current flowing in a motor 164a provided to operate the compressor 164.

The current detector 182 may include a first current sensor 182a provided to detect a current flowing in the motor 150 rotating the drum 120, and a second current sensor (not shown) provided to detect a current flowing in the motor 164a operating the compressor 164.

The first current sensor 182a may be connected to the motor 150 and may be provided in the first driving device 210, and the second current sensor may be connected to the motor 164a of the compressor and may be provided in the second driving device 220.

The controller 190 controls the overall operation of the dryer.

The controller 190 controls the operation of the dryer based on a drying load corresponding to an amount of objects to be dried. The controller 190 may also control the operation of the dryer based on a dryness degree input to the input device 171. The dryness degree input to the input device 171 may be the target dryness degree, and may be a target humidity for determining the end of the drying process.

The controller 190 obtains current information flowing in the motor 150 based on detection information detected by the first current sensor 182a, and determines a drying load for an object to be dried accommodated in the drum 120 based on the obtained current information. For example, the drying load may be divided into a small load, a medium load larger than the small load, and a large load larger than the medium load.

The controller 190 obtains a drying algorithm corresponding to the determined drying load. That is, the controller 190 may obtain at least one of the rotational speed of the motor 150, a frequency of the compressor 164, and a superheat degree of the evaporator 163 using the drying algorithm.

The controller 190 adjusts a degree of condensation of moisture in the evaporator by controlling the degree of superheat of the evaporator based on the obtained drying algorithm. Herein, controlling the degree of superheat of the evaporator includes adjusting a degree of opening of an expansion valve provided in the heat pump.

The controller 190, when controlling the driving of the motor 150, estimates a position of a rotor based on the detected current and voltage commands, obtains the rotational speed of the motor based on the estimated position of the rotor, obtains a target current based on a comparison result between the obtained rotational speed of motor and a target rotational speed, and controls a current to be applied to the motor based on the obtained target current and the detected current, thereby controlling the rotational speed of the motor 150.

The controller 190 controls the drum 120 and the fan 140 to rotate through the driving of the motor 150 upon the drying operation to tumble the object to be dried in the drum 120 and circulate the air in the drum 120.

The controller 190 controls the compressor and expansion valve of the heat pump to operate upon the drying operation to perform heat exchange of the air discharged from the drum and transfer the heat-exchanged air to the drum.

That is, the controller 190 outputs a control signal of the motor 150 for operating the motor 150 to the first driving device 210, outputs a control signal of the motor 164a of the compressor 164 for operating the compressor of the heat pump to the second driving device 220, and outputs a control signal of the expansion valve for adjusting the opening degree of the expansion valve of the heat pump to the third driving device 230.

The controller 190 may determine whether to end the drying based on humidity information, temperature information, and dryness degree information detected by at least one of a humidity sensor, a temperature sensor, and an electrode sensor, and may control to stop the operations of the motor, the compressor, and the expansion valve when it is determined that it is a drying end time point.

When it is determined that the door 130 is opened based on a signal received from the opening/closing switch 180 upon the drying operation, the controller 190 may control an operation of the heat pump 160 so that the operation of the heat pump is maintained for a predetermined time.

More specifically, when it is determined that the door 130 is opened based on the signal received from the opening/closing switch 180, the controller 190 may control an operation of the compressor 164 so that the operation of the compressor 164 is maintained for a predetermined time, and may control the opening of the expansion valve to be maintained, but to be maintained in a set opening degree.

Herein, operating the compressor 164 includes converting power supplied from the outside and applying the converted power to the motor 164a of the compressor so that the motor 164a is operated.

At this time, the dryer may be operated to supply hot air into the drum by stopping the rotation of the fan and the drum and operating only the compressor.

When the opening/closing detector 181 is provided in the dryer, the controller 190 may determine whether the door is opened or closed based on a signal detected by the opening/closing detector 181, transmit the turn-off signal to the opening/closing switch 180 when it is determined that the door is opened, and may transmit the turn-on signal to the opening/closing switch 180 when it is determined that the door is closed.

When it is determined that the door is opened, the controller 190 controls the operation of the motor 150 to be stopped and controls the operation of the heat pump to be maintained for the predetermined time.

In addition, the motor may be stopped by the protector when it is determined that the door is opened.

That is, in the present embodiment, not only the motor may be stopped through the controller, but also the motor may be stopped through the protector.

Accordingly, the motor may be stopped by the control operation of the controller even when a failure occurs in the protector, and the motor 150 may be stopped by the protector even when a failure or error occurs in the controller or in a connection configuration between the controller and the motor. When it is determined that the door is opened, the controller 190 controls an operation of the display device 172 to output notification information for notifying the door opening. The controller 190 may also output the notification information for notifying the opened state of the door through a speaker.

The controller 190 determines whether a preset time has elapsed from a time point at which the turn-off signal is received from the opening/closing switch 180 when it is determined that the door is in the opened state, determines whether the turn-on signal is received from the opening/closing switch 180 when it is determined that the preset time has elapsed, operates the motor 150 when it is determined that the turn-on signal is received from the opening/closing switch 180, and controls the operation of the heat pump 160 to be also stopped when it is determined that the turn-off signal is received from the opening/closing switch 180.

The controller 190 determines whether the preset time has elapsed from the time point at which the turn-off signal is received from the opening/closing switch 180 when it is determined that the door is in the opened state, operates the motor 150 again when it is determined that the preset time has elapsed, determines whether the turn-off signal is received from the opening/closing switch 180 when operating the motor 150 again, and controls the operation of the heat pump 160 to be also stopped when it is determined that the turn-off signal is received from the opening/closing switch 180. When the motor 150 operates again in response to the control command of the controller 190, the motor 150 may be automatically stopped when the turn-off signal is output from the opening/closing switch.

The preset time may be a shorter time than the predetermined time.

The controller 190 may determine whether the door is in the opened state, the closed state, or a shaking state based on the turn-on signal received from the opening/closing switch 180.

The shaking state of the door is a state in which the turn-on signal and the turn-off signal are alternately and repeatedly received within a reference time. That is, the shaking state of the door is a state in which the turn-on signal and the turn-off signal are alternately output through the opening/closing switch 180 as the opening/closing switch 180 is switched from the turn-off state to the turn-on state by the door 130 and the main body 110 being momentarily separated and the door 130 coming into contact with the main body 110 again.

The controller 190 may control the operation of the heat pump 160 so that the operation of the heat pump is maintained for the predetermined time when it is determined that the door is in the shaking state, that is, the door is in the abnormal state.

When it is determined that the door is in the abnormal state, the controller 190 operates the motor 150 when it is determined that the preset time has elapsed from the time point at which the turn-off signal is first received from the opening/closing switch, determines whether the turn-off signal is received from the opening/closing switch 180 when operating the motor 150, and controls the operation of the display device to output the notification information for notifying the abnormal state of the door when it is determined that the turn-off signal is received from the opening/ closing switch 180. The controller 190 may also output the notification information for notifying the abnormal state of the door through the speaker.

The controller 190 may control to stop the operation of the motor 150 when an overcurrent detection signal output through a terminal (FO) of the first driving device 210 is received.

The controller 190 may control to stop the operation of the motor 150 when at least one of an overvoltage detection signal and an overheat detection signal output through the terminal (FO) of the first driving device 210 is received.

The controller 190 may be implemented as a memory (not shown) for storing an algorithm for controlling the operations of components inside the dryer or data for a program reproducing the algorithm and a processor (not shown) for performing the above-described operations using data stored in the memory. In this case, the memory may be implemented as a separate chip from the processor. Alternatively, the memory may be implemented as a single chip with the processor.

The storage device 190a stores the drying algorithm capable of being performed in the dryer.

The storage device 190a stores information on the rotational speed of the motor, the frequency of the compressor, and the superheat degree of the evaporator corresponding to the drying algorithm.

The storage device 190a may store information on the predetermined time and the preset time.

The storage device 190a may be implemented as at least one of a non-volatile memory device such as a cache, a ROM (read only memory), a PROM (programmable ROM), an EPROM (erasable programmable ROM), an EEPROM (electrically erasable programmable ROM), and a flash memory, a volatile memory device such as a RAM (random access memory), and a storage medium such as a HDD (hard disk drive) and a CD-ROM, but is limited thereto.

The storage device 190a may be a memory implemented as a chip separate from the aforementioned processor related to the controller 190, or may be implemented as a single chip with the processor.

The first driving device 210 outputs a plurality of gate control signals in response to the control command of the controller 190 to the motor 150 so that the motor is driven at a rotational speed corresponding to the target rotational speed. A configuration of the first driving device will be described with reference to FIGS. 4 to 6.

As illustrated in FIG. 4, the first driving device 210 may include a first inverter 211 having a plurality of power conversion switches Q11 to Q13 and Q21 to Q23, and a first inverter driver 212 provided to output a plurality of gate control signals in response to the control command of the controller 190 or a signal received from the protector 250 to the first inverter 211. The first inverter 211 and the first inverter driver 212 may be provided as an inverter power module (IPM) on one substrate.

As illustrated in FIG. 5, the first inverter 211 may apply a driving voltage corresponding to the voltage command of the controller to the motor 150, and may supply a current corresponding to the current command of the controller to the motor 150.

The first inverter 211 includes a plurality of power conversion switches to convert DC power delivered from a smoothing part 215 into three-phase alternating current (AC) power.

The plurality of power conversion switches of the first inverter 211 is respectively driven depending on the control command of the controller 190 to modulate a width of a pulse transmitted to the motor 150.

A plurality of switching elements of the first inverter 211 may include the three upper switching elements Q11 to Q13 and the three lower switching elements Q21 to Q23.

Each of the three upper switches Q11 to Q13 and the three lower switches Q21 to Q23 may be connected in series. That is, the first upper switch Q11 and the first lower switch Q21 may be connected in series on a U terminal, the second upper switch Q12 may be connected in series with the second lower switch Q22 on a V terminal, and the third upper switch Q13 may be connected in series with the third lower switch Q23 on a W terminal. In addition, a plurality of diodes may be connected in parallel to the U terminal, the V terminal, and the W terminal, respectively.

Three nodes to which the three upper switches Q11 to Q13 and the three lower switches Q21 to Q23 are respectively connected are respectively connected to three input terminals a, b, and c of the motor 150. Accordingly, current may be supplied to the motor 150 through the three input terminals a, b, and c.

Each of the gates of the plurality of power conversion switches Q11 to Q13 and Q21 to Q23 of the first inverter 211 may be connected to the first inverter driver 211, and may be turned on or off based on a signal of the first inverter driver received through the gates.

The plurality of power conversion switches Q11 to Q13 and Q21 to Q23 of the first inverter 211 may be turned on or off based on the control command of the controller 190 received through the gates when the dryer normally performs the drying operation.

That the dryer normally performs the drying operation may mean that the drying operation is performed in the state in which the door is closed.

The lower switches Q21 to Q23 among the plurality of power conversion switches of the first inverter 211 may be turned off in response to the gate control signals of the first inverter driver 212 when the door is in the abnormal state upon the drying operation.

The first driving device 210 may further include a power supply 213, a rectifier 214, and the smoothing part 215 in addition to the first inverter 211 and the second inverter driver 212.

The power supply 213 is connected to an external power terminal (not shown) to receive commercial AC power from the outside and transmit the AC power to the rectifier 214.

The rectifier 214 includes at least one diode, rectifies the AC power input from the power supply 213, and transmits the rectified power to the smoothing part 215.

The rectifier 214 may include a bridge diode to which four diodes are connected. In addition, the rectifier may include six diodes.

The smoothing part 215 includes at least one capacitor, smooths the power transmitted from the rectifier 214 in order to lower a pulsating current of the power rectified by the rectifier 214, converts the smoothed power into direct current (DC) power of a certain size for driving the motor 150, and transmits the direct current power to the inverter 211.

The dryer may further include a voltage sensor 182b connected to both ends of the smoothing part 215 for outputting a DC voltage to detect the DC voltage.

The power supply 213, the rectifier 214, and the smoothing part 215 may also be provided in the second driving device provided to drive the motor 164a of the compressor. That is, the power supply 213, the rectifier 214, and the smoothing part 215 of the first driving device provided to drive the motor 150 and the power supply 213, the rectifier 214, and the smoothing part 215 of the second driving device provided to drive the motor 164a of the compressor may be identical to each other. That is, the dryer may include the one power supply 213, the one rectifier 214 and the one smoothing part 215, and each of the first inverter and the second inverter may be connected to the one power supply 213, the one rectifier 214 and the one smoothing part 215.

In a conventional clothes treating apparatus, an AC input relay is used to stop the operation of the clothes treating apparatus in response to the abnormal state of the door, and thus high voltage control may not be performed. However, in the present embodiment, because the relay for the AC input is not used to stop the operation of the clothes treating apparatus in response to the abnormal state of the door, the high voltage control is easy. That is, in various embodiments of the present disclosure, the high voltage control may be easily performed by adjusting the voltage using a switching device.

As illustrated in FIG. 6, the first inverter driver 212 includes a terminal (FO) 212a connected to the protector 250 provided to protect the motor 150 and the user and to which a voltage changed by turning on or off of the protector 250 is applied, a voltage detector 212b provided to detect the voltage applied to the terminal (FO) 212a, and a gate driver 212c provided to output a gate control signal corresponding to a signal output from the voltage detector 212b.

The terminal (FO) 212a may be a terminal connected to the controller 190 to output a failure signal in response to an overcurrent. The terminal (FO) 212a may output the failure signal to the controller 190.

The terminal (FO) 212a may also output a failure signal in response to overvoltage or overheating to the controller 190.

The voltage detector 212b may be connected to the terminal (FO) 212a to detect a voltage changed by a turn-on or turn-off driving of a protection switch S1 of the protector 250.

The voltage detector 212b may be provided in the first driving device 210 and may detect a voltage applied to the terminal (FO) of the first driving device 210.

The voltage detector 212b may be a comparator that outputs a signal in response to the door opening when an applied voltage is less than or equal to a reference voltage. The voltage detector 212b may output a high signal when the voltage applied to the terminal (FO) is less than or equal to the reference voltage. The voltage detector 212b may also output a low signal when the voltage applied to the terminal (FO) is less than or equal to the reference voltage. This may vary depending on the design of a comparator that functions as the voltage detector, and may vary depending on the type of comparator.

In a case in which the high signal is outputted as a signal in response to the door opening when the applied voltage is less than or equal to the reference voltage, the voltage detector 212b may output the low signal as a signal in response to the door closing when the applied voltage exceeds the reference voltage.

In a case in which the low signal is outputted as a signal in response to the door opening when the applied voltage is less than or equal to the reference voltage, the voltage detector 212b may output the high signal as a signal in response to the door closing when the applied voltage exceeds the reference voltage.

When the voltage detector 212b is provided outside the first driving device 210, the controller 190 may detect a voltage applied to the terminal (FO) of the first driving device 210 or detect a voltage output from the protector 250 based on a detection signal of the voltage detector 212b. In this case, the controller 190 may determine that the door 130 is opened when it is determined that the detected voltage is less than or equal to the reference voltage, and determine that the door 130 is closed when it is determined that the detected voltage exceeds the reference voltage.

The gate driver 212c may be a lower gate driver to output gate control signals of the lower switches Q21-Q23. The lower gate driver may output the gate control signals of the lower switches in response to the control command of the controller 190 upon the normal operation of the dryer.

The gate driver 212c transmits the gate control signals for turning off the plurality of lower switches to the gates of the plurality of switches in response to the abnormal state of the door.

For example, the gate driver 212c may output low signals as the gate control signals of the plurality of lower switches in response to the abnormal state of the door, and may output the gate control signals in response to the control command of the controller to the gates of the lower switches in response to a normal state of the door.

When the door is in the abnormal state, the controller does not generate and output a control command for controlling the plurality of lower switches.

The abnormal state of the door may include the opened state of the door and the shaking state of the door.

When the low signal is received from the voltage detector 212b, the gate driver 212c may output a signal for turning off the gates of the plurality of lower switches.

Depending on the design of the gate driver 212c, the gate driver 212c may output a signal for turning off the gates of the plurality of lower switches when the high signal is received from the voltage detector 212b.

The gate driver 212c may block the gate control signals to be transmitted to the lower switches among the plurality of power conversion switches when the door is in the abnormal state.

The first inverter driver 212 may further include an upper gate driver (not shown) provided to output gate control signals of the upper switches in response to the control command from the controller 190.

The first inverter driver 212 includes a failure output switch S2 connected to the terminal (FO) 212a and provided to output a signal for a failure of the motor 150 to the controller 190 through the terminal (FO) 212a, a comparator connected to a gate of the failure output switch S2, a current sensing terminal (CS) to which a signal in response to a current detected from the first current sensor 182a is received, an overcurrent detector 212d connected to the current sensing terminal (CS) and provided to output an overcurrent detection signal to a timer when a detection current corresponding to the received signal is equal to or greater than a reference current, and the timer 212e connected to the overcurrent detector 212d and provided to count an occurrence time of overcurrent when the overcurrent signal is received from the overcurrent detector 212d and output the failure signal to the comparator when the counted time is equal to or greater than a reference time.

The failure output switch S2 may be a no bulk type N-channel MOSFET. The failure output switch S2 may have a drain connected to the terminal (FO) 212a and a source connected to a ground.

The comparator outputs a signal corresponding to a signal received from the timer 212e to the gate of the failure output switch S2 so that a state of the failure output switch S2 is switched.

At this time, the signal of the failure output switch S2 received to the terminal (FO) 212a may be input to the controller 190 as the failure signal in response to the overcurrent.

For example, the failure output switch S2 may be maintained in a turned-off state when the motor 150 operates normally, and may be switched to a turned-on state in response to a failure such as generation of overcurrent. That is, the failure output switch S2 may be in the turned-off state when the low signal is received to the gate, and switched to the turned-on state when the high signal is received to the gate in response to a failure.

As the failure output switch S2 is implemented as a different type of switch, the failure output switch S2 may be in the turned-on state when the low signal is received to the gate, and switched to the turned-off state when the high signal is received to the gate in response to a failure.

The second driving device 220 and the third driving device 230 operate the heat pump 160 to generate a heat source for heating the air in the drum 120 in response to the control command of the controller 190. That is, the second driving device 220 operates the compressor 164 in response to the control command of the controller 190, and the third driving device 230 operates the expansion valve 162 in response to the control command of the controller 190.

The second driving device 220 adjusts the frequency of the compressor 164 in response to the control command of the controller 190.

As illustrated in FIG. 7, the second driving device 220 includes a second inverter 221 having a plurality of power conversion switches, and a second inverter driver 222 provided to output a plurality of gate control signals in response to the control command of the controller 190 to the second inverter 221. The second inverter 221 and the second inverter driver 222 may be provided as an inverter power module (IPM) on one substrate.

The configuration of the second inverter 221 is the same as that of the first inverter, and thus a description thereof will be omitted.

The plurality of power conversion switches Q11 to Q13 and Q21 to Q23 of the second inverter 221 may be turned on or off based on the control command of the controller 190 based on the drying algorithm even when the abnormal state of the door occurs.

The second driving device 220 may further include the power supply 213, the rectifier 214, and the smoothing part 215 in addition to the second inverter 221 and the second inverter driver 222.

The power supply 213, the rectifier 214, and the smoothing part 215 may be in common with those of the first inverter. That is, the first driving device and the second driving device of the dryer may convert power supplied to the inverter of each of the driving devices from the one power supply 213, the one rectifier 214, and the one smoothing unit 215.

The terminal (FO) of the second inverter driver 222 may be connected to the controller 190, and may transmit a failure signal in response to a failure due to at least one of overcurrent, overvoltage, and overheating of the motor 164a to the controller 190.

The third driving device 230 opens or closes the expansion valve 162 in response to a control command of the controller 190, and also controls the opening degree of the expansion valve 162.

As illustrated in FIG. 6, the protector 250 may be provided between the opening/closing switch 180 and the first inverter driver 212 of the first driving device 210.

The protector 250 may be connected to the terminal (FO) 212a of the first inverter driver 212.

The protector 250 may include the protection switch S1 provided to be switched to a turned-on state or a turned-off state in response to the turned-on or turned-off state of the opening/closing switch 180.

The protection switch S1 may be a switching element provided to be in a turned-on state when the turn-on signal is received from the opening/closing switch 180 and to be in a turned-off state when the turn-off signal is received from the opening/closing switch 180. The protection switch S1 may be a BJT of an NPN type. In addition, the protection switch S1 may be implemented through various switching devices. For example, the protection switch S1 may be implemented as a MOSFET or a transistor.

The protector 250 includes a first resistor R1 provided between the opening/closing switch 180 and a base of the protection switch S1, a second resistor R2 connected between the base and an emitter of the protection switch S1, a third resistor R3 connected between a power terminal 5V_IS and a collector of the protection switch S1, a photo coupler (PC) connected to a contact point between the collector of the protection switch S1 and the third resistor R3, and a fourth resistor R4 connected between a switching element of the photo coupler (PC) and a power terminal 5V.

The switching element of the photo coupler (PC) and the fourth resistor R4 may be connected to the terminal (FO).

Hereinafter, an operation process of the dryer in which the protector 250 is provided between the first driving device 210 and the opening/closing switch 180 will be described.

The dryer generates the turn-on signal from the opening/closing switch 180 when the door 130 is closed during the drying operation. At this time, the protection switch S1 of the protector 250 may be in the turned-on state.

When the protection switch S1 is turned on, a current flows to the ground through the power terminal 5V_IS and the collector and emitter of the protection switch, and at this time, the photo coupler (PC) is turned off.

As the photo coupler (PC) is turned off, the terminal (FO) of the first inverter driver 212 of the dryer may be connected to a power supply Vcc (5V) through the second resistor. A voltage of about 5V may be applied to the first inverter driver 212, and this voltage may be detected by the voltage detector 212b. The voltage detector 212b outputs a signal in response to the door closing to the lower gate driver 212c when the voltage of about 5V is detected. In this case, the first inverter driver 212 may enable the lower gate driver 212c.

The first inverter driver 212 of the dryer generates a gate control signal in response to a control command of a first controller and outputs the generated gate control signal to the plurality of power conversion switches, so that the motor 150 is rotated and the drum and the fan are rotated by the rotation of the motor.

The dryer generates the turn-off signal from the opening/closing switch 180 when the abnormal state such as the opening and shaking of the door 130 occurs upon the drying operation. At this time, the protection switch S1 of the protector 250 may receive the turn-off signal from the opening/closing switch 180 and may be switched to the turn-off state by receiving the turn-off signal.

When the protection switch S1 is turned off, a voltage is applied to the photo coupler (PC) through the power terminal 5V_IS, and at this time, a current flows through the photo coupler, so that the photo coupler (PC) may be turned on.

As the photo coupler (PC) is turned on, the terminal (FO) of the first inverter driver 212 of the dryer may be connected to the ground. A voltage less than or equal to the reference voltage of about 1.2V may be applied to the first inverter driver 212, and this voltage may be detected by the voltage detector 212b. When the voltage of about 1.2V is detected, the voltage detector 212b outputs a signal in response to the abnormal state of the door to the lower gate driver 212c. At this time, the lower gate driver 212c outputs the gate control signals for turning-off the lower switches among the plurality of power conversion switches to the lower switches, so that the motor 150 is stopped and the drum and the fan are stopped by stopping the motor 150.

The first inverter driver 212 may disable the lower gate driver 212c.

Figure 8:
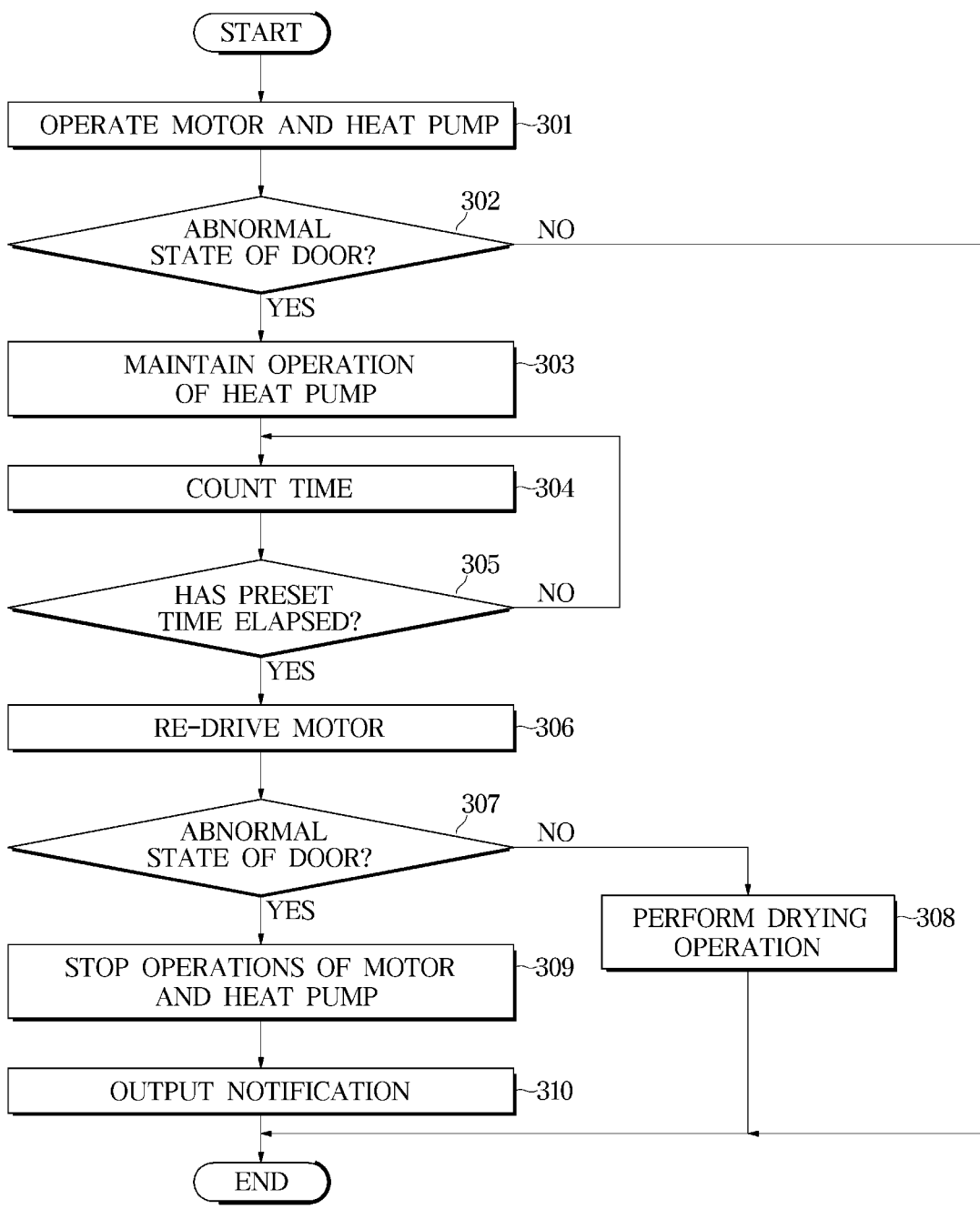
FIG. 8 is a control flowchart of the dryer according to an embodiment.

FIG. 8 is a control flowchart of the dryer according to an embodiment.

The dryer performs a drying standby mode and activates the user interface when the closing signal of the door is received after an object to be dried is put into the drum.

The dryer performs an operation for determining a drying load when a start command of the drying process is received through the input device 171 of the user interface. In addition, when the dryer is able to communicate, the dryer may receive the start command of the drying process through a communication device.

The dryer obtains a drying algorithm corresponding to the determined drying load, and performs the drying operation based on the obtained drying algorithm.

Obtaining the drying algorithm may include obtaining the rotational speed of the motor, the frequency of the compressor, and the superheat degree of the evaporator corresponding to the determined drying load.

The dryer operates the motor and the heat pump when performing the drying operation (301). At this time, the drum and the fan are rotated by the operation of the motor, the air to be introduced into the drum is heated by the operation of the heat pump, and moisture is removed from the air discharged from the drum.

The dryer determines the abnormal state of the door during the drying operation (302).

The abnormal state of the door may include the opened state of the door and the shaking state of the door. That is, the turn-off signal may be received from the opening/closing switch in response to the opening of the door, and the turn-off signal and the turn-on signal may be alternately received from the opening/closing switch in response to the shaking state of the door.

Determining the abnormal state of the door may include determining whether the turn-off signal is received from the opening/closing switch at least once.

When it is determined that the door is in the abnormal state, the dryer stops the operation of the motor 150 and maintains the operation of the heat pump (303), so that moisture may be removed from the air discharged from the drum and the air introduced into the drum may be heated.

Maintaining the operation of the heat pump may include operating the compressor and opening the expansion valve.

In addition, when the abnormal state of the door occurs, the motor is stopped by a passive circuit in the protector and the first inverter driver, so that the drum and the fan may be changed to a state in which the operations thereof is stopped.

That is, in the present embodiment, while the motor is stopped through the controller provided in the dryer, the motor may also be stopped through the protector.

Accordingly, even when a failure of the protector occurs, the motor may be stopped by the control operation of the controller, and even when a failure or error occurs in the controller or in the connection configuration between the controller and the motor, the motor 150 may be stopped by the protector.

The dryer counts the time from a time point at which the abnormal state of the door is determined (304), determines whether the preset time has elapsed based on the counted time (305), and re-drives the motor by outputting a control command of the motor to the first driving device when it is determined that the preset time has elapsed (306).

When the abnormal state of the door occurs due to the shaking of the door, the dryer may count the time from a time point at which the turn-off signal is first inputted from the opening/closing switch. In this case, the motor 150 may be in a stopped state for a preset time from the time point at which the turn-off signal is first received.

The dryer re-determines the abnormal state of the door while performing the re-driving of the motor 150 (307), and performs the drying operation when it is determined that the door is in the normal state, that is, when it is determined that the door is in the closed state (308).

On the other hand, when the turn-off signal is received from the opening/closing switch or when it is determined that the motor is in the stopped state, the dryer stops the operations of the motor and the heat pump by determining that the door is in the abnormal state (309), and outputs a notification such that the user may recognize the abnormal state of the door (310). For example, the abnormal state of the door may be displayed as an image through the display device, or the abnormal state of the door may be output as sound through the speaker.

When the door is in the abnormal state, the motor may be stopped by the controller or may be stopped by the protector and the first inverter driver.

The dryer may perform the door abnormality determination by a preset number of times, and at this time, the heat pump may operate for the predetermined time from the time point at which the turn-off signal is first received from the opening/closing switch, and may stop the operation after the predetermined time elapses.

Figure 9:
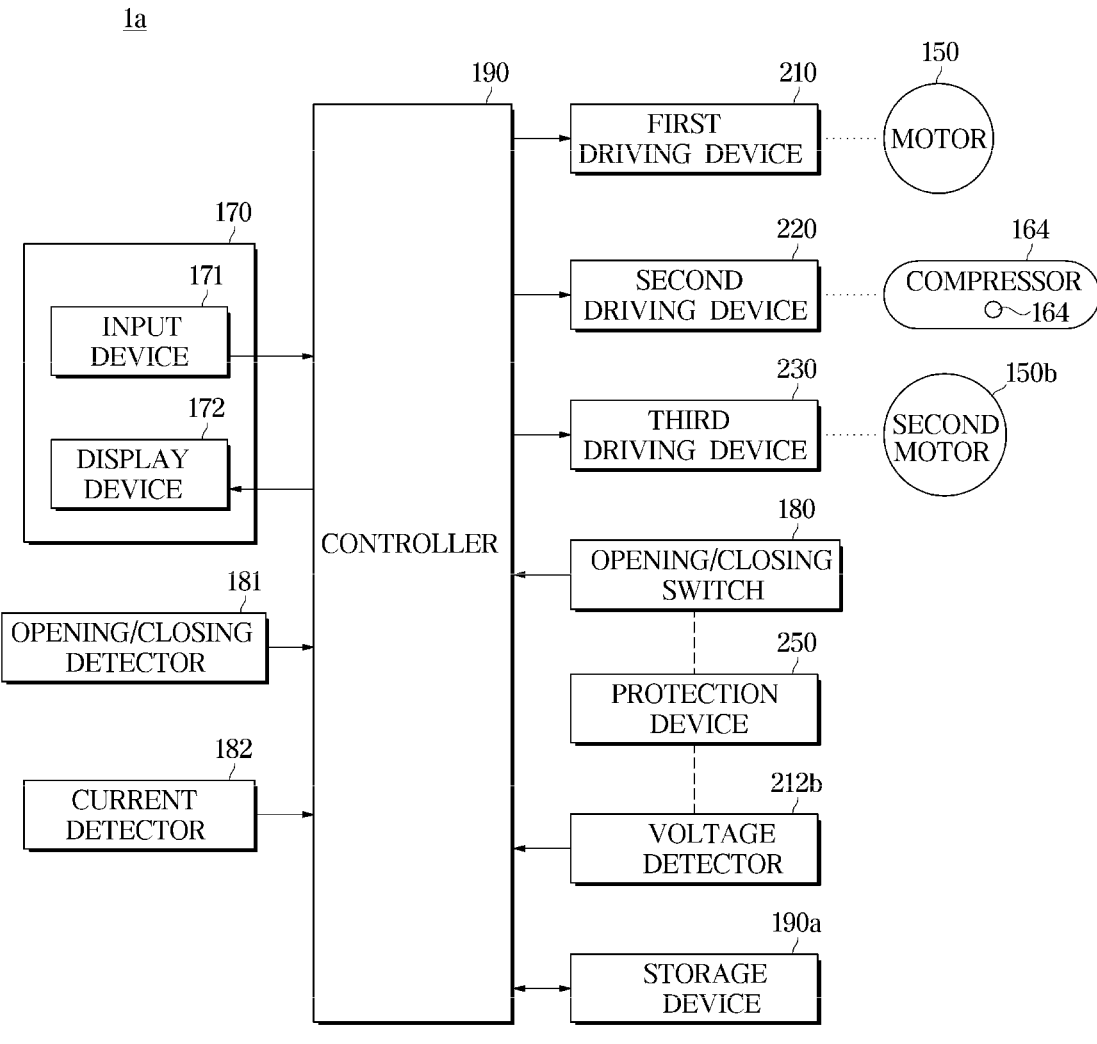
FIG. 9 is a control configuration diagram of a dryer according to another embodiment.

FIG. 9 is a control configuration diagram of a dryer according to another embodiment.

A dryer 1a according to another embodiment includes first and second motors 150a and 150b, the compressor 164, the user interface 170, the plurality of detectors 181, 182, 212b, the controller 190, the storage device 190a, the plurality of driving devices 210, 220, 240, and the protector 250.

The dryer includes the first motor 150a provided to drive the drum and the second motor 150b provided to drive the fan. That is, in the dryer 1a according to another embodiment, the second motor 150b for the fan and the first motor 150a for the drum may be separately provided.

Accordingly, the first driving device 210 provided to control the first motor 150a and the third driving device 240 provided to control the second motor 150b may be included.

The third driving device 240 drives the second motor connected to the fan in response to the control command of the controller 190.

The first driving device 210 may be the same as the first driving device according to an embodiment. The second driving device 220 may also be the same as the second driving device according to an embodiment.

The configuration other than the above is the same as in an embodiment, and thus a description thereof will be omitted.

As the second motor 150b, which is a motor for the fan, and the first motor 150a, which is a motor for the drum are separately provided, the controller 190 of the dryer according to another embodiment may maintain the operations of the second motor 150*b* and the motor 164*a* of the compressor for the predetermined time when it is determined that the door 130 is in the abnormal state, and may control the operations of the second motor 150*b* and the motor 164*a* of the compressor to stop when it is determined that the door is in the abnormal state even after a predetermined time.

When the abnormal state of the door occurs, the first motor may be automatically stopped by the operations of the opening/closing switch, the protector, and the passive circuit of the first inverter driver of the first driving device. Due to this, the drum may be stopped.

The configuration of the controller other than the above is the same as in an embodiment, and thus a description thereof will be omitted.

The disclosed embodiments may be implemented in the form of a recording medium storing instructions executable by a computer. The instructions may be stored in the form of program code, and when executed by a processor, a program module may be created to perform the operations of the disclosed embodiments. The recording medium may be implemented as a computer-readable recording medium.

The computer-readable recording medium includes any type of recording medium in which instructions readable by the computer are stored. For example, the recording medium may include a read only memory (ROM), a random access memory (RAM), a magnetic tape, a magnetic disk, a flash memory, an optical data storage device, and the like.

The embodiments disclosed with reference to the accompanying drawings have been described above. However, it will be understood by those skilled in the art that various changes in form and details may be made therein without departing from the spirit and scope of the present disclosure as defined by the appended claims. The disclosed embodiments are illustrative and should not be construed as limiting.

What is claimed is:

1. A clothes treating apparatus comprising:
a drum;
a door provided to open and close the drum;
an opening/closing switch provided to output a signal in response to opening or closing of the drum by the door;
a motor provided to rotate the drum;
a controller configured to generate a control command for controlling a rotational speed of the motor;
a driving device comprising an inverter provided to convert power applied to the motor and an inverter driver provided to output a control signal of the inverter in response to the generated control command;
a protection switch connected between the opening/closing switch and a first power terminal; and
a photo coupler connected between the protection switch and a terminal of the inverter driver, and connected a second power terminal,
wherein
the protection switch is turned off based on the opening/closing switch being turned off, and is turned on based on the opening/closing switch being turned on,
the photo coupler is turned off based on the protection switch being turned on, and is turned on based on the protection switch being turned off,
the terminal of the inverter driver is connected to the second power terminal based on the photo coupler being turned off, and is connected to a ground based on the photo coupler being turned on, and
the inverter driver turns off the inverter based on the terminal of the inverter driver being connected to the ground and turns on the inverter based on the terminal of the inverter driver being connected to the second power terminal.

2. The clothes treating apparatus according to claim 1, further comprising:
a rectifier provided to rectify AC power; and
a smoothing part provided to smooth the rectified power and apply the smoothed power to the inverter.

3. The clothes treating apparatus according to claim 1, wherein
the terminal of the inverter driver is a terminal provided to output a failure signal among terminals provided in the inverter driver.

4. The clothes treating apparatus according to claim 1, wherein
the inverter comprises a plurality of power conversion switches, and
the inverter driver transmits signals for turning off a plurality of lower switches among the plurality of power conversion switches.

5. The clothes treating apparatus according to claim 1, wherein
the protection switch comprises a bipolar junction transistor (BJT).

6. The clothes treating apparatus according to claim 5, further comprising:
a first resistor connected between a base of the bipolar junction transistor and the opening/closing switch;
a second resistor connected between the base and an emitter of the bipolar junction transistor;
a third resistor connected between a collector of the bipolar junction transistor and the first power terminal;
a fourth resistor connected between the photo coupler and the second power terminal and connected to the terminal of the inverter driver.

7. The clothes treating apparatus according to claim 1, further comprising:
a fan provided to be rotated by the motor.

8. The clothes treating apparatus according to claim 1, further comprising:
a heat pump comprising a compressor, a condenser connected to the compressor, an expansion valve connected to the condenser, and an evaporator connected to the expansion valve, and provided to circulate a refrigerant in an order of the compressor, the condenser, the expansion valve, and the evaporator; and
a driving device for the heat pump provided to operate the heat pump in response to a control command of the controller.

9. The clothes treating apparatus according to claim 8, wherein
the controller is configured to:
determine an abnormal state of the door based on a signal of the opening/closing switch,
maintain an operation of the heat pump for a predetermined time when it is determined that the door is in the abnormal state, and
stop an operation of the compressor when it is determined that the abnormal state of the door is maintained even after a predetermined time elapses from a time point at which the abnormal state of the door is determined.

10. The clothes treating apparatus according to claim 8, wherein
the controller is configured to, when a turn-on signal and a turn-off signal are alternately output by the opening/closing switch, maintain an operation of the compressor for a predetermined time from a time point at which the turn-off signal is first received.

11. The clothes treating apparatus according to claim 1, further comprising:

a fan provided to circulate air through an inside and outside of the drum; and a motor for the fan provided to rotate the fan, wherein the controller is configured to determine an abnormal state of the door based on the signal output by the opening/closing switch, and when it is determined that the door is in an abnormal state, maintain an operation of the motor for the fan for a predetermined time.

12. The clothes treating apparatus according to claim 1, further comprising:

an opening/closing detector provided to detect the opening and closing of the door, wherein the controller is configured to determine an opened state or a closed state of the door based on detection information of the opening/closing detector, and turn on the opening/closing switch when it is determined that the door is in the closed state.

13. The clothes treating apparatus according to claim 1, wherein the inverter driver further comprises:

a current sensor provided to detect a current flowing in the motor, a failure output switch provided to determine that an overcurrent occurs when a current output through the current sensor is equal to or greater than a reference current and to be turned on in response to the overcurrent occurrence, and a terminal provided to connect the failure output switch and the controller.

14. The clothes treating apparatus according to claim 1, further comprising:

a voltage detector provided to detect a voltage equal to or less than a reference voltage based on the protection switch being turned off, and detect a voltage corresponding to a voltage of the second power terminal based on the protection switch being turned on.

* * * * *